F. W. MEYER.
REGULATING SYSTEM FOR ELECTRIC MACHINES OF THE REVOLVING FIELD TYPE.
APPLICATION FILED OCT. 7, 1911.

Patented June 13, 1916.

2 SHEETS—SHEET 1.

WITNESSES:
Fred H. Miller
Otto S. Schairer

INVENTOR
Friedrich W. Meyer
BY
Wiley G. Carr
ATTORNEY

F. W. MEYER.
REGULATING SYSTEM FOR ELECTRIC MACHINES OF THE REVOLVING FIELD TYPE.
APPLICATION FILED OCT. 7, 1911.

Patented June 13, 1916.

UNITED STATES PATENT OFFICE.

FRIEDRICH WILHELM MEYER, OF DUISBURG, GERMANY, ASSIGNOR TO WESTINGHOUSE ELECTRIC & MANUFACTURING COMPANY, A CORPORATION OF PENNSYLVANIA.

REGULATING SYSTEM FOR ELECTRIC MACHINES OF THE REVOLVING-FIELD TYPE.

1,186,818.

Specification of Letters Patent.

Patented June 13, 1916.

Application filed October 7, 1911. Serial No. 653,380.

*To all whom it may concern:*

Be it known that I, FRIEDRICH WILHELM MEYER, Dr. Ing., a subject of the King of Prussia, and resident of Grabenstrasse 53, Duisburg, Rhine Province, Germany, have invented a new and Improved Process in Regulating Systems for Electric Machines of the Revolving-Field Type; and I do hereby declare the following is a full, clear, and exact description of the same, reference being had to the accompanying drawings, forming a part of this specification.

My invention relates to alternating current dynamo electric machines, and it has for its object to provide a machine that may be operated as a motor at variable speeds under economical and advantageous conditions, or as a regulating machine for induction and similar motors so that the latter may be caused to operate under such conditions.

The problem of providing an alternating current motor, the speed of which may be economically regulated under substantially all working conditions without greatly disturbing the power factor of the supply circuit, is one to which considerable attention has been devoted. In the attempt to satisfactorily solve this problem, the polyphase commutator motor has been provided, in which the brushes have been shifted and the number of convolutions in the field or stator winding has been varied in order to obtain the desired speed and power factor regulation. The expedient of shifting the brushes possesses many disadvantages, the main objection being that proper commutating fields cannot readily be provided for the range of brush movement usually necessary or desirable.

According to the present invention, the stator of the motor is provided with a distinct winding for each phase so arranged that the positions of the effective portions thereof may be shifted and the numbers of convolutions of which may be adjusted to obtain speed regulation while still maintaining a good power factor, the brushes remaining stationary to permit of the convenient and economical employment of commutating windings to prevent sparking at the brushes.

Figure 1:
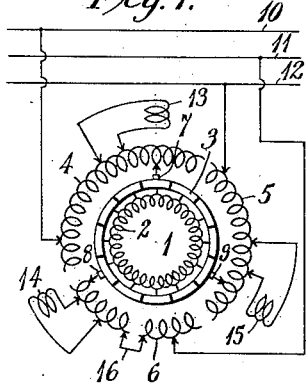
Figure 2:
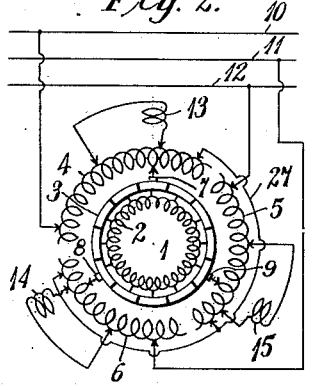
Figure 3:
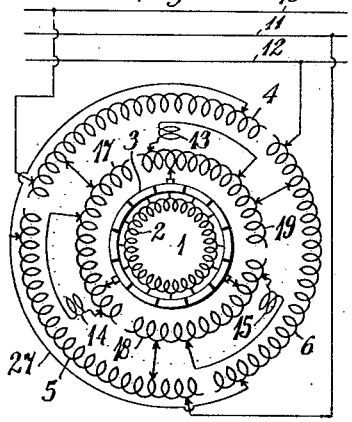
Figure 4:
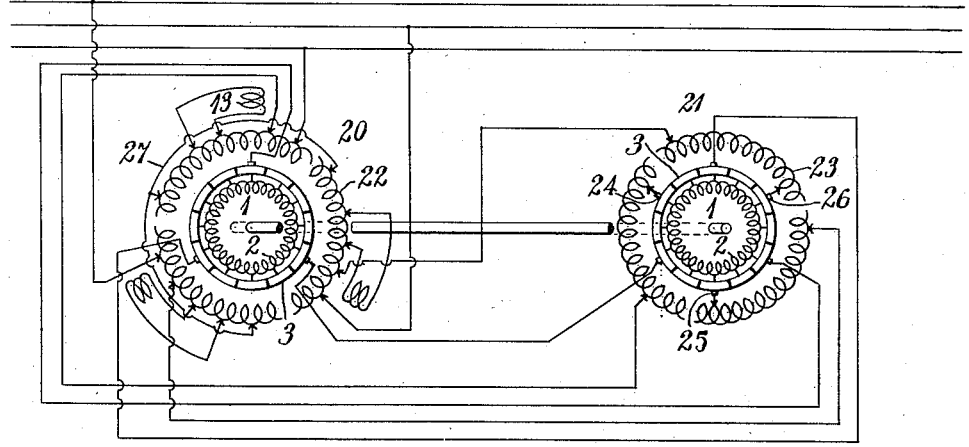
Figure 5:
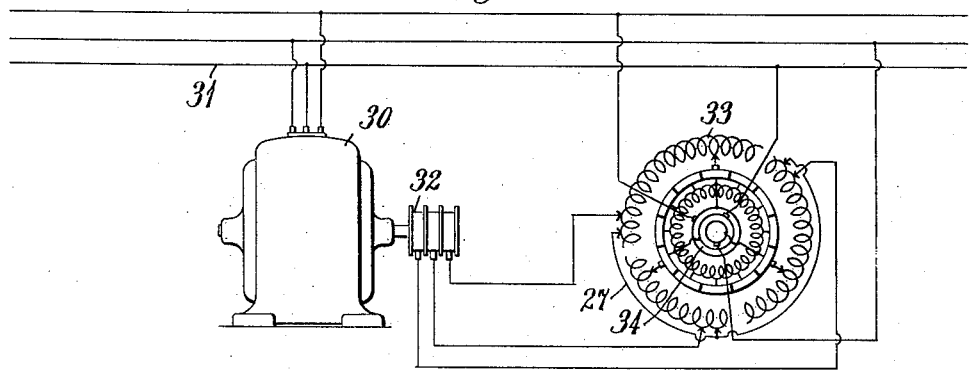
Figure 6:
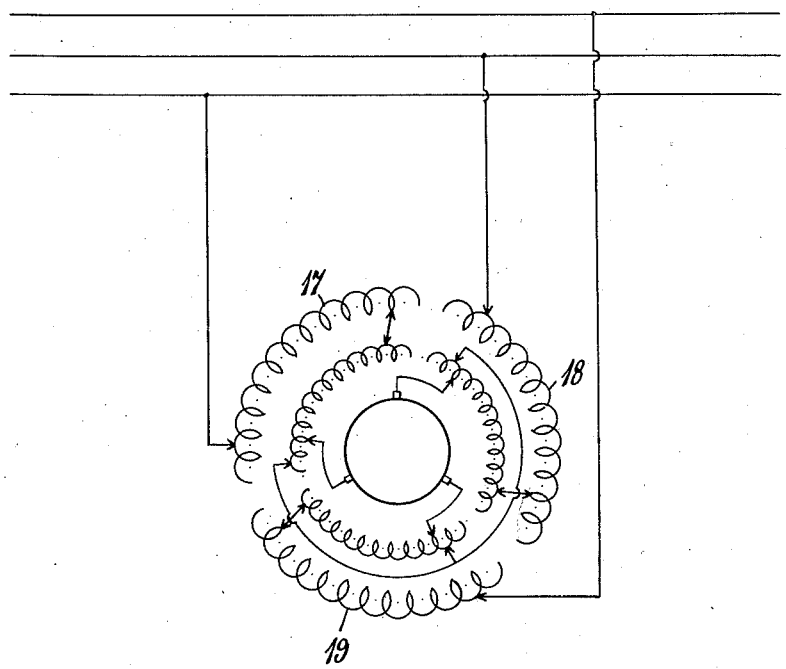

My invention is illustrated in the accompanying drawing, Figure 1 of which is a diagrammatic view of a motor embodying the same and having a series characteristic. Fig. 2 is a similar view of a motor having a shunt motor characteristic. Fig. 3 is a similar view of a motor provided with a compound winding. Fig. 4 is a similar view of two mechanically coupled motors embodying my invention and respectively having series and shunt field windings. Fig. 5 is a diagrammatic view showing a motor embodying the invention employed as a regulating machine for an induction motor, and Fig. 6 is a modification of the motor of Fig. 3.

In its simplest form, the machine of the present invention comprises a rotatable armature 1, having a winding 2 that is connected in the usual manner to the segments of a commutator cylinder 3, and a stationary member or stator provided with a progressive distributed winding similar to that ordinarily employed in previously constructed direct current machines or in polyphase alternating current commutator and induction motors, except that the different phase portions 4, 5 and 6 thereof are separate and distinct and are preferably not permanently connected together. The commutator brushes 7, 8 and 9 are preferably stationary and are respectively connected to suitable points in corresponding phase portions of the field or stator winding, the said points of connection being preferably adjustable both for the purpose of regulating the numbers of convolutions of the said portions of the windings, and for adjusting the positions of the effective portions thereof with respect to the commutator brushes. Other points in the several portions of the field or stator winding, which are preferably near the opposite ends of the said portions of the windings to which the commutator brushes are connected, are respectively connected to conductors 10, 11 and 12 of a suitable supply circuit. The connections of the convolutions in the several portions of the field winding are preferably adjustable for the purpose of adjusting the numbers of convolutions in the several portions of the field winding and for adjusting the positions of the effective portions thereof with respect to the commutator brushes. Commutating windings 13, 14 and 15 are also provided upon the stator, which windings are connected between suitable points in the several phase portions of the main winding, the said points of connection being preferably adjustable for the purpose of regulating the effects of the commutating windings. If desired, the auxiliary or commutating windings may be extended over the stator sufficiently to enable them to serve also for improving the field form when the motor is under load. The points of connection of the commutator brushes and of the supply circuit to the stator winding may be regulated either by a separate controller or by a regulating commutator on the machine itself. If a large range of regulation is desired, it may be desirable to divide each phase portion of the main winding into two or more parts, and to employ an adjustable connection between the said parts, such, for instance, as shown at 16. In this manner, objectionable disturbance of the revolving field form and a corresponding influence upon the commutation may be avoided.

It will be noted that in the motor of Fig. 1, the current derived from the supply circuit passes first through the main stator or field winding and then through the armature. This motor, therefore, has the characteristic of an ordinary series motor. However, in cases where it is necessary that the motor maintain a substantially uniform speed under variation of load, a simple series motor cannot be employed. In such cases, a separate circuit may be provided for the current in the field or main stator winding, as shown in Fig. 2, by the provision of an adjustable connector 27 that is adapted to connect together the several phase portions of the field or main stator winding at or near the ends thereof opposite to the ends at or near which the supply circuit is connected to said windings. The commutator brushes are adjustably connected to suitable intermediate points of the respective phase portions of the field or main stator winding. With this arrangement, the positions of the active portions of the field winding with respect to the commutator brushes, the numbers of active convolutions in the various phase portions of the field winding, and the voltage applied to the armature, may be separately adjusted for the purpose of regulating the speed, the power factor, and the starting torque of the motor. However, if desired for the sake of simplicity of construction, any one or more of the separate regulating features may be omitted, and if a large range of regulation is desired, the positions of the gaps between the several phase portions of the field winding may also be shifted. This arrangement also permits of employment of commutating windings.

It will, of course, be understood that the cross sections of the conductors employed in the various windings will depend upon the maximum currents passing through them, and that, consequently, all of the conductors of each winding may not be of uniform section.

If it is desired to obtain greater uniformity of speed with variations of load than can be obtained with a motor having a shunt motor characteristic, as that of Fig. 2, the motor may be provided, as in Fig. 3, with a special series winding 17, 18 and 19 in addition to a main shunt winding like that employed in Fig. 2. Suitable portions of this series winding are included in the connections between the commutator brushes and the shunt field winding. In this manner, a compounding action is obtained, the amount or degree of which may be regulated by adjustment of the various points of connections of the several windings and circuits with each other. The compounding action is not limited to passing only the armature current through the series winding, but, if desired, the total current may also be passed therethrough, in which case the series winding will be included in the connections between the supply circuit and the shunt field winding as shown in Fig. 6. The adjustments for phase compensation or power factor under no-load conditions may be made in connection with the shunt field winding, and the additional compensation for load may be made in connection with the series field winding, which load compensation is obtainable between fairly wide limits at the higher speeds. This arrangement of the windings is particularly applicable where it is desired to obtain a load equalizing action by the provision of a flywheel upon the motor shaft or other parts having considerable inertia that are connected to the motor.

A greater degree of power factor compensation and regulation may be obtained if two mechanically coupled motors 20 and 21 are employed, the one (20) having a shunt field winding 22, and the other (21) having a series field winding 23 that is included in adjustable connections between the shunt field winding 22 of the motor 20 and one set of commutator brushes 24, 25 and 26 of the series machine 21. The members of a second set of commutator brushes of the series machine 21 are respectively connected to the brushes of the shunt machine 20. The pole numbers of the two machines are preferably so adjusted with respect to each other that the shunt machine 20 will tend to operate at less than synchronous speed, and the series machine 21 will tend to operate above synchronous speed.

The motor of the present invention may be employed, not only for the purpose of directly driving a load, but it may also be employed, if desired, as a means for regulating the speed and power factor of an induction motor in a manner such that comparatively slight losses of energy will be involved in the regulation. In Fig. 5, the motor is shown as applied to this purpose, the primary member 30 of the induction motor being connected in the usual manner to a supply circuit 31, and its secondary member 32 being connected to the field or main stator winding 33 of a motor of the kind hereinbefore described, except for the fact that slip rings 34, which are connected to suitable points in the armature winding, are also connected to the supply circuit. With this arrangement, the induction motor which drives the load may be operated at comparatively high speed, and will, of course, be of sufficient size and capacity to carry the load, while the regulating commutator machine will be only of sufficient size and capacity to provide for the desired range of speed regulation, and will, therefore, in most, if not all, cases be much smaller than the induction motor. Inasmuch as the arrangement shown in Fig. 5 forms the subject matter of a separate divisional application, Serial No. 741,457, filed Jan. 11, 1913, the manner in which the induction motor is regulated by the auxiliary commutator machine will not be here fully discussed, but reference may be had to such divisional application.

I claim as my invention:

1. A polyphase alternating-current machine comprising a progressive distributed field-magnet winding having a plurality of phase divisions, an armature having a commutator cylinder, brushes engaging said commutator cylinder corresponding in number to the phase divisions of the field-magnet winding, and means for rendering active at will different portions of the field-magnet winding.

2. A polyphase alternating-current machine comprising a progressive distributed field-magnet winding having a plurality of phase divisions, an armature having a commutator cylinder, brushes engaging said commutator cylinder corresponding in number to the phase divisions of the field-magnet winding and respectively adjustably connected thereto, and means for rendering active at will different portions of the field-magnet winding.

3. A polyphase alternating current machine comprising a progressive distributed field magnet winding having a plurality of phase divisions, an armature having a commutator cylinder, brushes engaging said commutator cylinder, and means for varying the active lengths of the several phase divisions of the field magnet winding and the positions of the active portions of said phase divisions.

4. A polyphase alternating current machine comprising a distributed field magnet winding having a plurality of phase divisions, an armature having a commutator cylinder, brushes engaging said commutator, means for varying the active lengths of the several phase divisions of the field magnet winding and the positions of the active portions of said phase divisions, and commutating windings respectively connected to the several phase divisions of the field magnet winding.

5. A polyphase alternating current machine comprising a distributed field magnet having a plurality of phase divisions, an armature having a commutator cylinder, brushes engaging said commutator cylinder, means for varying the positions of the active portions of the several phase divisions of the field magnet winding, and commutating windings respectively connected to the several phase divisions of the field magnet winding.

6. A polyphase alternating-current machine comprising a progressive distributed field-magnet winding having a plurality of phase divisions, an armature having a commutator cylinder, brushes engaging said commutator cylinder respectively adjustably connected to the several phase divisions of the field-magnet winding, and means whereby the several phase divisions of the field-magnet winding may be connected together and different portions thereof rendered active.

7. A polyphase alternating current machine comprising a progressive distributed field magnet winding having a plurality of phase divisions, an armature having a commutator cylinder, brushes engaging said commutator cylinder respectively connected to the several phase divisions of the field magnet winding, and means for adjustably connecting together the several phase divisions of the field magnet winding and for adjusting the positions of the active portions of the said phase divisions.

8. A polyphase alternating current machine comprising a distributed field magnet winding having a plurality of phase divisions, an armature having a commutator cylinder, brushes engaging said commutator cylinder respectively connected to the several phase divisions of the field magnet winding, and means for connecting together the several phase divisions of the field magnet winding and for varying the active lengths of the several phase divisions of the field magnet winding and the positions thereof with respect to the commutator brushes.

9. A polyphase alternating current machine comprising a plurality of distributed field magnet windings each having a plurality of phase divisions, a portion of each phase division of one winding being connected in series with the active portion of the corresponding phase division of the other winding, an armature having a commutator cylinder, and brushes engaging said commutator cylinder and respectively connected to the phase divisions of one of the field magnet windings.

10. A polyphase alternating current machine comprising a progressive distributed field magnet winding having a plurality of phase divisions, means for varying the positions of the active portions of the several phase divisions of the field magnet winding, an armature having a commutator cylinder, brushes engaging said commutator cylinder, and commutating windings.

11. A polyphase alternating current machine comprising a progressive distributed field magnet winding having a plurality of phase divisions, means for varying the positions and lengths of the active portions of the several phase divisions of the field magnet winding, an armature having a commutator cylinder, brushes engaging said commutator cylinder, and commutating windings.

FRIEDRICH WILHELM MEYER.

Witnesses:
R. WEISS,
H. WENDL.

---

Correction in Letters Patent No. 1,186,818.

It is hereby certified that in Letters Patent No. 1,186,818, granted June 13, 1916, upon the application of Friedrich Wilhelm Meyer, of Duisburg, Germany, for an improvement in "Regulating Systems for Electric Machines of the Revolving-Field Type," an error appears in the printed specification requiring correction as follows: Page 1, line 100, for the words "convolutions in" read *supply circuit to;* and that the said Letters Patent should be read with this correction therein that the same may conform to the record of the case in the Patent Office.

Signed and sealed this 25th day of July, A. D., 1916.

[SEAL.]

F. W. H. CLAY,
*Acting Commissioner of Paten*

Cl. 172—280.